US012572181B2

(12) United States Patent (10) Patent No.: US 12,572,181 B2
Hou et al. (45) Date of Patent: Mar. 10, 2026

(54) SUPPORT STRUCTURAL MEMBER AND DISPLAY DEVICE

(71) Applicant: KunShan Go-Visionox Opto-Electronics Co., Ltd., Kunshan (CN)

(72) Inventors: Hongqi Hou, Kunshan (CN); Liwei Ding, Kunshan (CN); Fu Liao, Kunshan (CN); Zhaoji Zhu, Kunshan (CN); Yuhua Wu, Kunshan (CN); Kanglong Sun, Kunshan (CN)

(73) Assignee: KunShan Go-Visionox Opto-Electronics Co., Ltd., Kunshan (CN)

( * ) Notice: Subject to any disclaimer, the term of this patent is extended or adjusted under 35 U.S.C. 154(b) by 379 days.

(21) Appl. No.: 18/334,440

(22) Filed: Jun. 14, 2023

(65) Prior Publication Data

US 2023/0324960 A1 Oct. 12, 2023

Related U.S. Application Data

(63) Continuation of application No. PCT/CN2021/143742, filed on Dec. 31, 2021.

(30) Foreign Application Priority Data

Apr. 9, 2021 (CN) .......................... 202110384403.0

(51) Int. Cl.
G06F 1/16 (2006.01)
H04M 1/00 (2006.01)
H04M 1/02 (2006.01)

(52) U.S. Cl.
CPC .......... G06F 1/1656 (2013.01); G06F 1/1635 (2013.01); G06F 1/1652 (2013.01); H04M 1/0268 (2013.01)

(58) Field of Classification Search
CPC .... G06F 1/1656; G06F 1/1635; G06F 1/1652; G06F 1/1624; G06F 1/1637;
(Continued)

(56) References Cited

U.S. PATENT DOCUMENTS 7,324,093 B1* 1/2008 Gettemy ............... G06F 1/1698
345/157
10,664,013 B2* 5/2020 Jiang ..................... G06F 1/1641
(Continued)

FOREIGN PATENT DOCUMENTS

CN 104409648 B 2/2017
CN 110572497 A 12/2019
(Continued)

OTHER PUBLICATIONS

International Search Report issued on Mar. 30, 2022, in corresponding International Patent Application No. PCT/CN2021/143742, 7 pages.
(Continued)

*Primary Examiner* — Rockshana D Chowdhury
(74) *Attorney, Agent, or Firm* — Maier & Maier, PLLC

(57) ABSTRACT

A support structural member and a display device. The support structural member includes: a support frame, having a screen body support surface, in which the support frame includes a first support body and a second support body, the first support body and the second support body are connected to each other, and the second support body is enabled to move relative to the first support body in a first direction; a power unit, including a transmitting mechanism, a screen body connecting mechanism and a driver, in which the driver drives the second support body to move relative to the first support body in the first direction through the transmitting mechanism, and the driver drives the screen body connecting mechanism to move through the transmitting
(Continued)

mechanism, so that the second support body and the screen body connecting mechanism move in the same direction in the first direction.

19 Claims, 8 Drawing Sheets

(58) Field of Classification Search
CPC . G06F 3/0338; H04M 1/0268; H04M 1/0237; H04M 1/274; G09F 9/301; H05K 5/0221; H05K 13/0434; G11B 3/08545; G11B 15/67505; G06K 7/0047; G06K 13/085; G01J 5/20; G01T 7/10; A47G 1/17; E05B 17/22; E05B 47/0043; A45C 11/182; H04B 1/3833; H01H 13/64; B66F 11/044; G10L 2019/0002; H01R 13/10; B60J 7/192
See application file for complete search history.

(56) References Cited

U.S. PATENT DOCUMENTS

| | | | | |
|---|---|---|---|---|
| 10,868,897 | B2 * | 12/2020 | Cha | G06F 1/1652 |
| 11,012,546 | B1 * | 5/2021 | Song | G06F 1/1656 |
| 11,194,363 | B2 * | 12/2021 | Kim | G06F 1/1675 |
| 11,249,518 | B2 * | 2/2022 | Liao | G06F 1/1658 |
| 11,464,121 | B2 * | 10/2022 | Liu | H04M 1/0237 |
| 11,750,903 | B2 * | 9/2023 | Yu | H04M 1/0264 |
| | | | | 348/376 |
| 11,849,549 | B2 * | 12/2023 | Feng | G06F 1/1681 |
| 11,921,545 | B2 * | 3/2024 | Feng | H04M 1/0268 |
| 12,019,479 | B2 * | 6/2024 | Han | G06F 1/1652 |
| 12,167,552 | B2 * | 12/2024 | Feng | G06F 1/1652 |
| 12,262,487 | B2 * | 3/2025 | Wang | H04M 1/0237 |
| 12,341,918 | B2 * | 6/2025 | Hou | H04M 1/0216 |
| 12,346,169 | B2 * | 7/2025 | Kim | G06F 1/1624 |
| 12,360,554 | B2 * | 7/2025 | Park | G06F 1/1624 |
| 12,363,842 | B2 * | 7/2025 | Jiang | H05K 5/0217 |

| | | | | |
|---|---|---|---|---|
| 2012/0314400 | A1 * | 12/2012 | Bohn | H04M 1/0237 |
| | | | | 361/679.01 |
| 2016/0147261 | A1 | 5/2016 | Bohn et al. | |
| 2018/0081473 | A1 * | 3/2018 | Seo | G06F 3/044 |
| 2020/0152095 | A1 * | 5/2020 | Lee | G06F 3/147 |
| 2020/0363841 | A1 * | 11/2020 | Kim | G09F 9/301 |
| 2021/0181801 | A1 * | 6/2021 | Yin | G06F 1/1652 |
| 2021/0216108 | A1 * | 7/2021 | Lee | G06F 1/1652 |
| 2021/0267073 | A1 * | 8/2021 | Fan | G06F 1/1656 |
| 2022/0183167 | A1 * | 6/2022 | Liu | H05K 5/0217 |
| 2022/0238047 | A1 * | 7/2022 | Shin | H04M 1/0268 |
| 2022/0322550 | A1 * | 10/2022 | Yin | H05K 5/0217 |
| 2022/0361347 | A1 * | 11/2022 | Feng | G06F 1/1624 |
| 2022/0418123 | A1 * | 12/2022 | Liu | H04M 1/0237 |
| 2023/0110625 | A1 * | 4/2023 | Hong | G06F 1/1637 |
| | | | | 361/807 |
| 2023/0112933 | A1 * | 4/2023 | Yin | G06F 1/1681 |
| | | | | 361/679.01 |
| 2023/0324960 | A1 * | 10/2023 | Hou | G06F 1/1624 |
| | | | | 361/679.01 |
| 2024/0023261 | A1 * | 1/2024 | Park | F16C 11/04 |

FOREIGN PATENT DOCUMENTS

| | | | |
|---|---|---|---|
| CN | 111176382 | A | 5/2020 |
| CN | 111508374 | A | 8/2020 |
| CN | 111562818 | A | 8/2020 |
| CN | 111833748 | A | 10/2020 |
| CN | 111968503 | A | 11/2020 |
| CN | 112153180 | A | 12/2020 |
| CN | 212278266 | U | 1/2021 |
| CN | 112309258 | A | 2/2021 |
| CN | 113066385 | A | 7/2021 |
| CN | 113099012 | A | 7/2021 |

OTHER PUBLICATIONS

Office Action issued on Mar. 3, 2022, in corresponding Chinese Application No. 202110384403.0, 20 pages.

* cited by examiner

10

X

21

22

20

50     22     25

50      22      25

200

SUPPORT STRUCTURAL MEMBER AND DISPLAY DEVICE

CROSS REFERENCE TO RELATED APPLICATION

The present application is a continuation of International Application No. PCT/CN2021/143742, filed on Dec. 31, 2021, which claims priority to Chinese Patent Application No. 202110384403.0, filed on Apr. 9, 2021, titled "SUPPORT STRUCTURAL MEMBER AND DISPLAY DEVICE", both of which are hereby incorporated by reference in their entireties.

TECHNICAL FIELD

The present application relates to the technical field of display, and in particular to a support structural member and a display device.

BACKGROUND

With the development of science and technology, a mobile terminal device has been widely used and has become one of the basic supplies in human life. The mobile terminal device has experienced the development process from a small screen to a large screen. However, the screen of the mobile terminal device is fixed and unchanged, and when the user deals with different tasks, such as calling, gaming entertainment, processing documents and the like, they often have different requirements for the size of the display screen. Therefore, the mobile terminal device that cannot change the size of the screen display area cannot well meet the daily requirements of the users.

SUMMARY

The present application provides a support structural member and a display device, which can change a size of a display area to meet the daily requirements of the users.

In an aspect, the present application provides a support structural member for a display device, the support structural member includes:

a support frame, having a screen body support surface, in which the support frame includes a first support body and a second support body, the first support body and the second support body are connected to each other, and the second support body is enabled to move relative to the first support body in a first direction;

a power unit, including a transmitting mechanism, a screen body connecting mechanism and a driver, in which the driver drives the second support body to move relative to the first support body in the first direction through the transmitting mechanism, and the driver drives the screen body connecting mechanism to move through the transmitting mechanism, so that the second support body and the screen body connecting mechanism move in the same first direction.

The present application provides the support structural member, which can be used to provide a mounting foundation for a flexible screen. After the support structural member is assembled with the flexible screen, a display device with an adjustable display area of the flexible screen can be formed. In the support structural member, the first support body and the second support body can move relative to each other, so as to increase or decrease the area of the screen body support surface. The screen body connecting mechanism is configured to mount a moving end of the flexible screen. The screen body connecting mechanism and the second support body can move in the same first direction. When the second support body extends out in the first direction, the screen body connecting mechanism moves away from the first support body for unfolding the flexible screen, so that the display area of the flexible screen at a side of the screen body support surface can increase. When the second support body is retracted in the first direction, the screen body connecting mechanism moves close to the first support body for retracting the flexible screen, so that the display area of the flexible screen at a side of the screen body support surface can decrease. The power unit can drive the second support body to move in the first direction through the first transmitting mechanism, and can simultaneously drive the second support body and the screen body connecting mechanism to move in the same first direction through the first transmitting mechanism and the second transmitting mechanism. Therefore, the support structural member of embodiments of the present application can freely adjust the size of the screen body support surface, so that after being assembled with the flexible screen, the display area of the flexible screen can be freely adjusted, so as to meet the different requirements of users for the sizes of the screen display areas in different usage scenarios and improve the user experience satisfaction.

In another aspect, a display device provided by the present application includes: a flexible screen; and the support structural member, in which the screen body support surface is configured to support the flexible screen; one end of the flexible screen is connected to the first support body, and the other end of the flexible screen is bent and arranged at a side of the second support body away from the screen body support surface and connected to the screen body connecting mechanism; when the driver drives the screen body connecting mechanism and the second support body to move in the same first direction, an area of the flexible screen on the screen body support surface increases or decreases.

BRIEF DESCRIPTION OF THE DRAWINGS

In order to more clearly illustrate the technical solutions of the embodiments of the present application, the drawings to be used in the description of the embodiments of the present application will be described briefly below. Obviously, the drawings in the following description are merely some embodiments of the present application. For those skilled in the art, other drawings can also be obtained according to these drawings without the inventive labor.

DETAILED DESCRIPTION

The embodiments of the present application will be further described in detail below with reference to the drawings and examples. The detailed description and drawings of the embodiments below are used to illustrate the principles of the present application, but not to limit the scope of the present application, that is, the present application is not limited to the described embodiments.

In order to better understand the present application, the embodiments of the present application will be described referring to FIG. 1 to FIG. 8.

Figure 1:
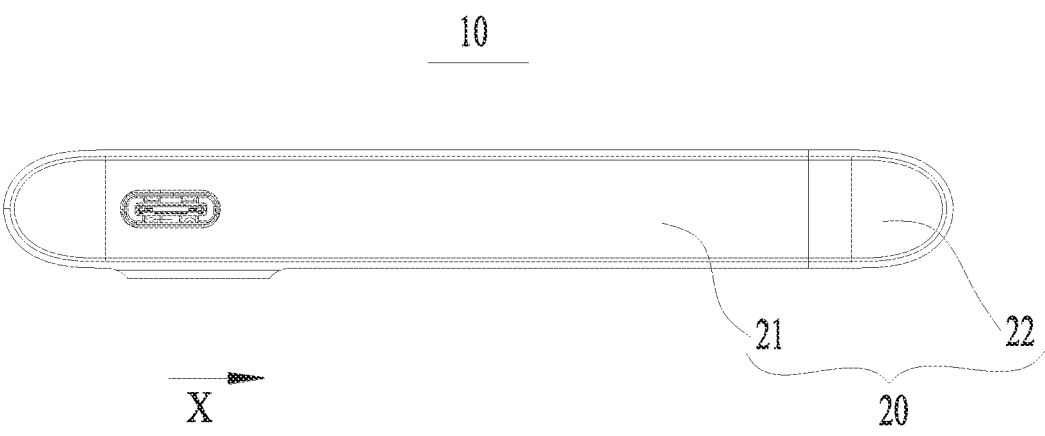
FIG. 1 shows a schematic structural side view of a support structural member in an initial state according to an embodiment of the present application.
Figure 2:
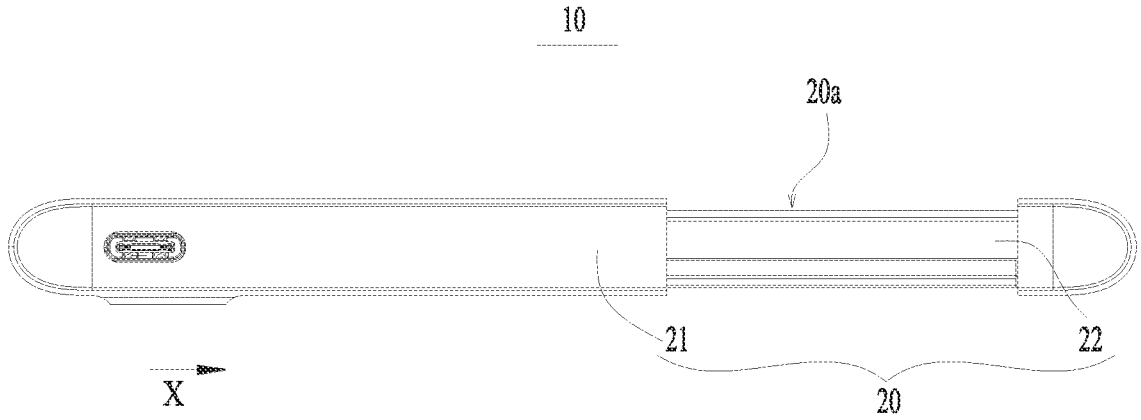
FIG. 2 shows a schematic structural side view of a support structural member in unfolding state according to an embodiment of the present application.

As shown in FIG. 1 and FIG. 2, the present application provides a support structural member 10 for a display device. The support structural member 10 can provide a mounting foundation for a flexible screen 100. Exemplarily, the flexible screen 100 refers to a screen that can be bent or rolled.

Figure 3:
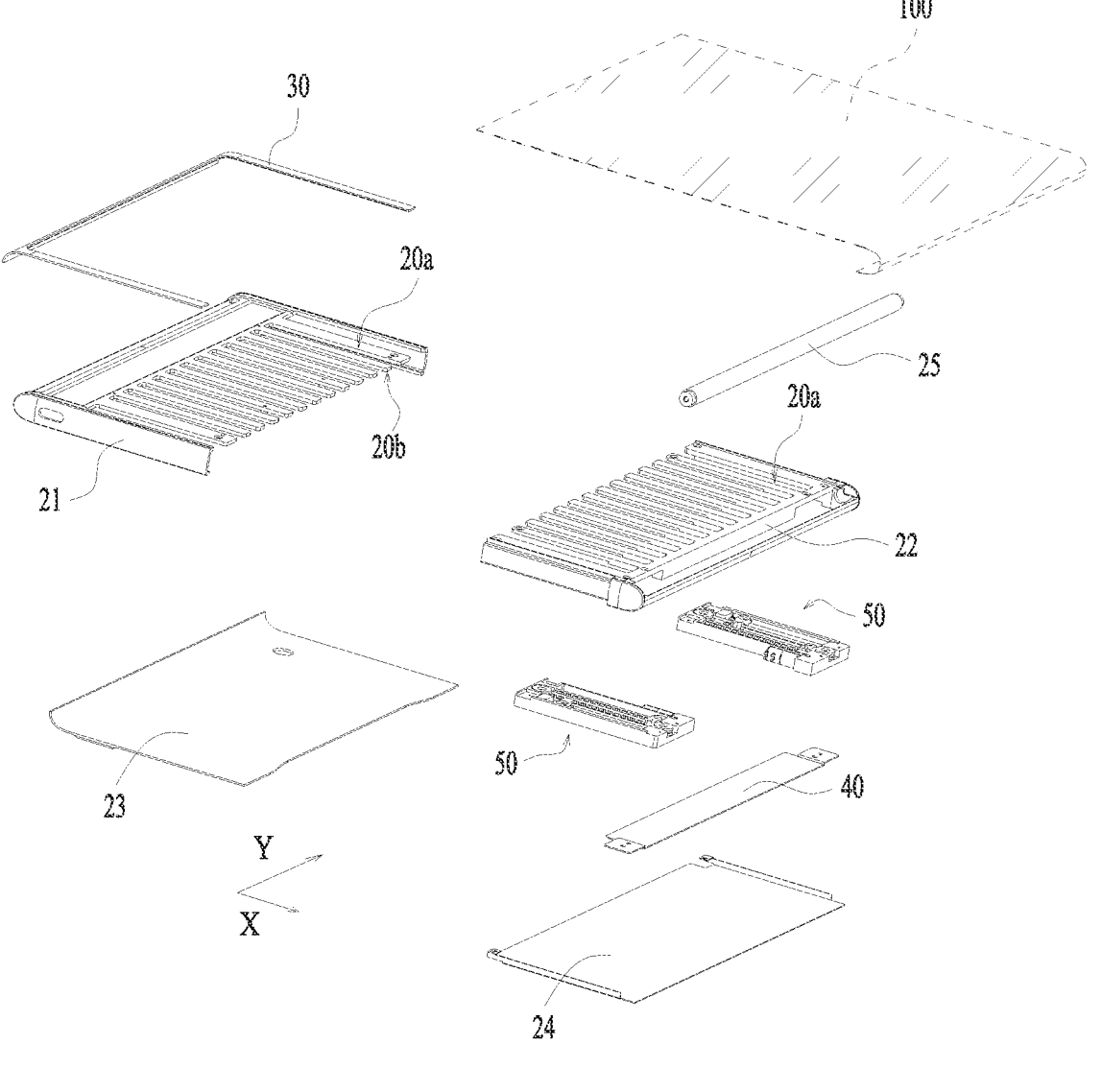
FIG. 3 shows a partial exploded structural schematic view of a support structure member according to an embodiment of the present application.

Referring to FIG. 1 to FIG. 3, the support structural member 10 provided by the present application includes a support frame 20 and a power unit 50. The support frame has a screen body support surface 20*a* and an inner surface 20*b*. The screen body support surface 20*a* is configured to support the flexible screen 100 to ensure the flatness of the flexible screen 100. The inner surface 20*b* is arranged opposite to the screen body support surface 20*a*. Exemplarily, when a user uses the display device including the support structural member 10, the screen body support surface 20*a* may be a surface facing the user.

The support frame 20 includes a first support body 21 and a second support body 22. The second support body 22 is enabled to move relative to the first support body 21 in a first direction X. In the embodiments, the first support body 21 does not move, and the second support body 22 moves. Certainly, the first support body 21 can also be moved while the second support body 22 does not move according to needs. After the flexible screen 100 is mounted on the support structural member 10, when the second support body 22 extends out relative to the first support body 21 in the first direction X, the area of the screen body support surface 20*a* can increase, so that the display area of the flexible screen 100 can correspondingly increase. When the second support body 22 is retracted relative to the first support body 21 in the first direction X, the area of the screen body support surface 20*a* can decrease, so that the display area of the flexible screen 100 will can correspondingly decrease.

The second support body 22 is connected with the power unit 50. The power unit 50 can drive the second support body 22 to move relative to the first support body 21, and displace synchronously with the second support body 22. The specific structural relationship between the power unit 50 and the second support body 22 will be described in detail when the structure of the power unit 50 is introduced below.

Exemplarily, the power unit 50 may be arranged at a side of the support frame 20 facing away from the screen body support surface 20*a*, that is, the power unit 50 is arranged at a side of the inner surface 20*b* of the support frame 20. The power unit 50 is located inside the support frame 20. Alternatively, the power unit 50 may be arranged outside the support frame 20, that is, the power unit 50 is placed outside the support frame 20.

Figure 4:
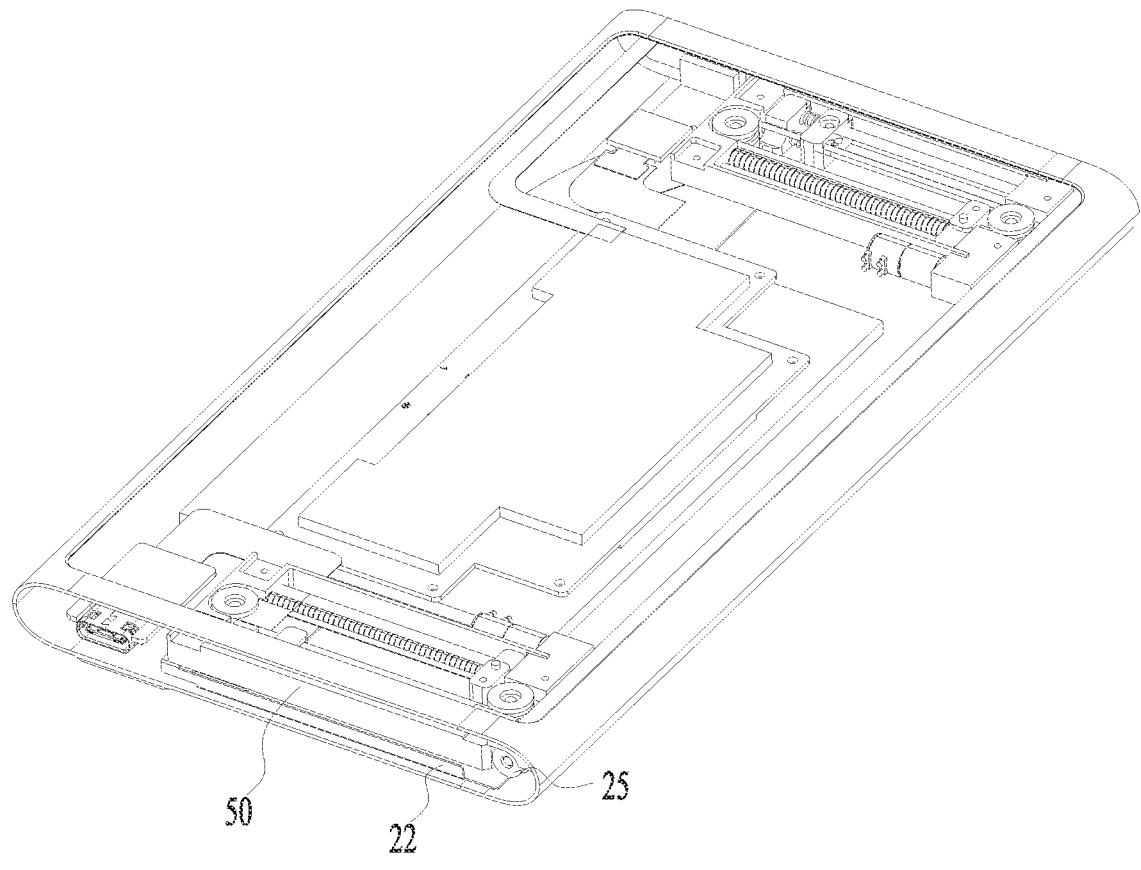
FIG. 4 shows a partial structural schematic view of a support structure member in an initial state according to an embodiment of the present application.
Figure 5:
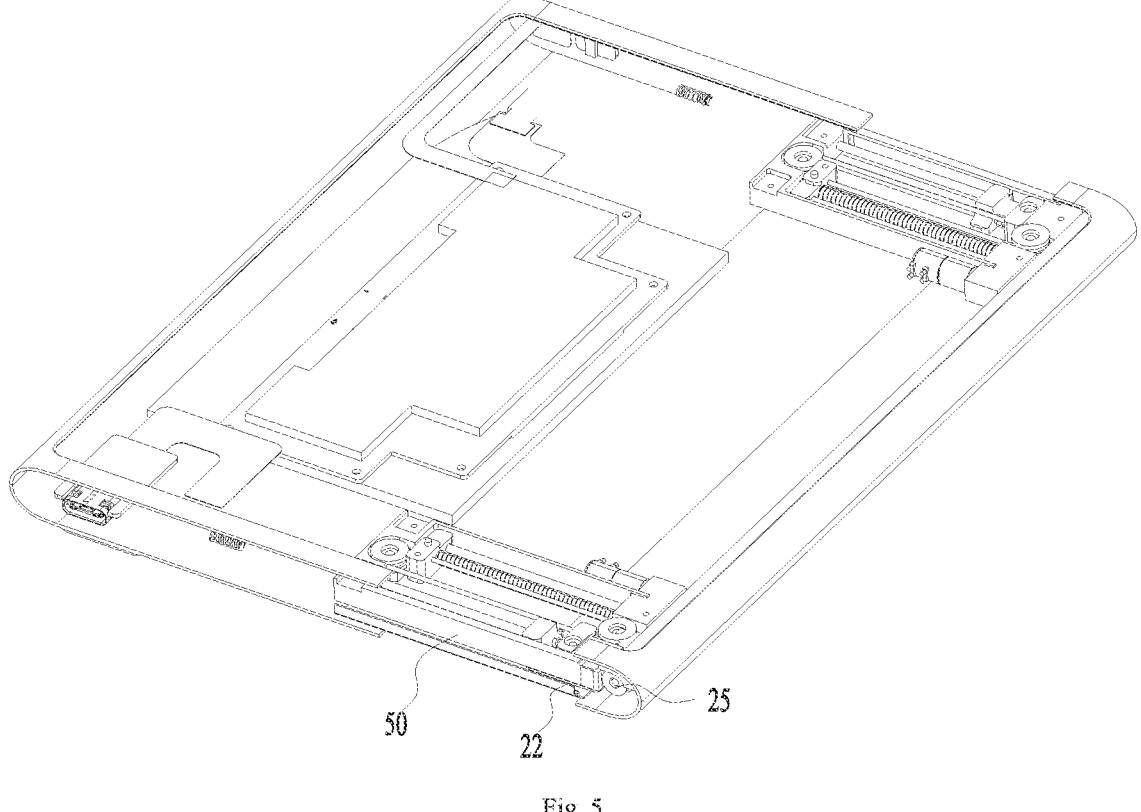
FIG. 5 shows a partial structural schematic view of a support structural member in an unfolding state according to an embodiment of the present application.
Figure 6:
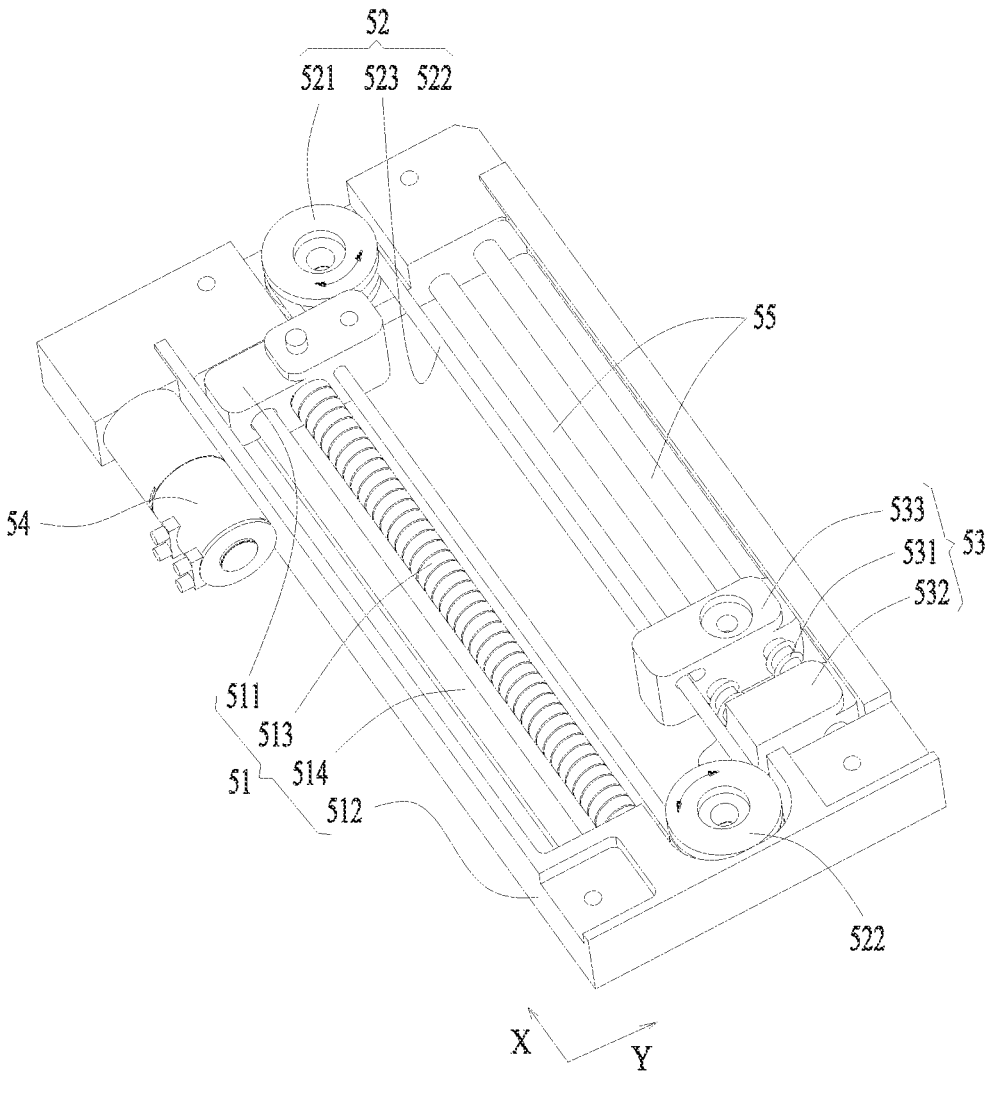
FIG. 6 shows a schematic structural view of a power unit according to an embodiment of the present application.

Referring to FIG. 4 to FIG. 6, the power unit 50 is arranged at the side of the inner surface 20*b* of the support frame 20. The power unit 50 includes a first transmitting mechanism 51, a second transmitting mechanism 52, a screen body connecting mechanism 53 and a driver 54. The first transmitting mechanism 51 and the second transmitting mechanism 52 are arranged in linkage. At least a part of the first transmitting mechanism 51 is connected and fixed to the second support body 22. At least a part of the screen body connecting mechanism 53 is connected and fixed to a moving end of the flexible screen 100. The driver 54 drives the second support body 22 to move through the first transmitting mechanism 51, and the driver 54 drives the screen body connecting mechanism 53 to move through the first transmitting mechanism 51 and the second transmitting mechanism 52, so that the second support body 22 and the moving end of the flexible screen 100 move in the same first direction X.

It should be noted that "The first transmitting mechanism 51 and the second transmitting mechanism 52 arranged in linkage" means that when the first transmitting mechanism 51 receives the power from the driver 54, the first transmitting mechanism 51 starts to work. At the same time, the first transmitting mechanism 51 can transmit the power to the second transmitting mechanism 52, so that when the first transmitting mechanism 51 is working, the second transmitting mechanism 52 is also in a working state.

The support structural member 10 in the embodiments of the present application can be configured to provide the mounting foundation for the flexible screen 100. After the support structural member 10 is assembled with the flexible screen 100, the display device in which the display area of the flexible screen 100 can be adjusted and varied can be formed. In the support structural member 10, the first support body 21 and the second support body 22 can move relative to each other, so as to increase or decrease the area of the screen body support surface 20*a*. The second support body 22 is mounted on the first transmitting mechanism 51, and the screen body connecting mechanism 53 is configured to mount the moving end of the flexible screen 100. Specifically, the screen body connecting mechanism 53 with the second support body 22 can move in the same first direction X relative to the first support body 21. When the second support body 22 extends out in the first direction X, the screen body connecting mechanism 53 moves away from the first support body 21 to expand the flexible screen 100, so that the display area of the flexible screen 100 at a side of the screen body support surface 20*a* can increase. When the second support body 22 is retracted in the first direction X, the screen body connecting mechanism 53 moves close to the first support body 21 to retract the flexible screen 100, so that the display area of the flexible screen 100 at the side of the screen body support surface 20*a* can decrease. In addition, the power unit 50 can drive the second support body 22 to move in the first direction X through the first transmitting mechanism 51, and can simultaneously drive the screen body connecting mechanism 53 in the first direction through the first transmitting mechanism 51 and the second transmitting mechanism 52, so that the second support body 22 and the screen body connecting mechanism 53 can move in the first direction X at the same time. Therefore, the support structural member 10 in the embodiments of the present application can freely adjust a size of the screen body support surface 20a, so that after being assembled with the flexible screen 100, the display area of the flexible screen 100 can be freely adjusted, so as to meet the different requirements of users for the sizes of the screen display areas in different usage scenarios and improve the user experience satisfaction.

In some embodiments, as shown in FIG. 4 to FIG. 6, the first transmitting mechanism 51 includes an connecting member 511, a base 512 and a transmitting member 513. The base 512 has an accommodating space extending in the first direction X, the transmitting member 513 is arranged in the base 512 and extends in the first direction X, and the connecting member 511 is connected to the transmitting member 513 and can move relative to the transmitting member 513 in the first direction X.

The first transmitting mechanism 51 is connected to the first support body 21 through the connecting member 511, the base 512 is connected to the second support body 22, that is, the connecting member 511 of the transmitting unit 50 is fixed on the first support body 21, and the base 512 is fixed on the second support body 22. The transmitting member 513 is connected with the base 512 and the connecting member 511, herein the transmitting member 513 and the base 512 always remain relatively unchanged in the first direction X, and the transmitting member 513 can move relative to the connecting member 511 in the first direction X.

The driver 54 is arranged on the base 512 and moves relative to the connecting member 511 in the first direction X by driving the transmitting member 513. During this process, relative positions of the transmitting member 513 and the base 512 in the first direction X remains relatively unchanged, and the transmitting member 513 and the connecting member 511 move relatively in the first direction, so that the second support body 22 fixed on the base 512 will move relative to the first support body 21 fixed on the connecting member 511. Optionally, the driver 54 is located at a side of the transmitting member 513 in a second direction Y.

After the driver 54 outputs the power to the transmitting member 513, the transmitting member 513 can move relative to the connecting member 511, so that the transmitting member 513, the base 512, the driver 54 and the second support body 22 all move relative to the first support body 21 in the first direction X. Exemplarily, the connecting member 511 is connected to the first support body 21 by a fastener. The base 512 is connected to the second support body 22 by the fastener. The base 512 may be a rectangular frame. The driver 54 may be a servo motor or a stepper motor.

In some examples, the transmitting member 513 is a threaded rod. The transmitting member 513 extends in the first direction X, and two ends of the transmitting member 513 are rotatably connected to the base 512. The transmitting member 513 is threadedly connected to the connecting member 511. When the driver 54 drives the threaded rod to rotate, the threaded rod moves relative to the connecting member 511 in the first direction X. Exemplarily, when the driver 54 drives the threaded rod to rotate clockwise, the threaded rod, the base 512, the driver 54 and the second support body 22 move in the first direction X and away from the first support body 21. When the driver 54 drives the threaded rod to rotate counterclockwise, the threaded rod, the base 512, the driver 54 and the second support body 22 move in the first direction X and approach to the first support body 21.

According to the rotation transmission of the threaded rod, it is beneficial to improve the movement stability of the second support body 22, and reduce the possibility of an instantaneous impact force on the flexible screen 100 caused by the impact of the second support body 22 during the moving process, thereby reducing the possibility of the flexible screen 100 being torn due to the instantaneous impact force. Exemplarily, two ends of the threaded rod may be rotatably connected to the base 512 by a rolling bearing or a sliding bearing.

In some embodiments, the first transmitting mechanism 51 further includes a first guide rail 514. The first guide rail 514 is connected to the base 512. The transmitting member and the first guide rail are arranged side by side and to be spaced from each other in a second direction Y Optionally, each of the first guide rail 514 and the transmitting member 513 is located in the base 512, and the first guide rail 514 is located between the transmitting member 513 and the driver 54 in the second direction Y.

The first guide rail 514 is movably connected to the connecting member 511 in the first direction X. The first guide rail 514 extends in the first direction X. By providing the first guide rail 514, the stability of the moving process of the second support body 22 can be improved, so that it is beneficial to reduce the possibility of the accidental damage to the flexible screen 100 caused by the adverse impact of the second support body 22 on the flexible screen 100. Exemplarily, two opposite ends of the first guide rail 514 are connected and fixed to the base 512, and a middle part of the first guide rail 514 is movably connected to the connecting member 511. The first guide rail 514 may be a guide rod. The first guide rail 514 is slidably connected to the connecting member 511.

Figure 7:
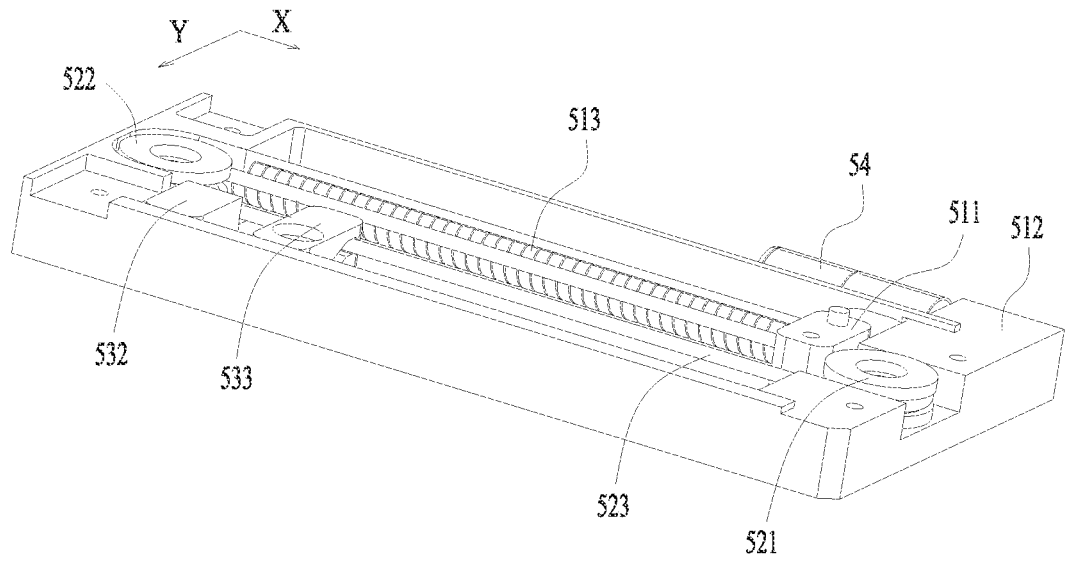
FIG. 7 shows a structural schematic view of the power unit of the embodiment shown in FIG. 6 from another perspective.

In some embodiments, referring to FIG. 6 and FIG. 7, the second transmitting mechanism 52 includes a first roller 521, a second roller 522 and a flexible belt 523. The first roller 521 and the second roller 522 are arranged spaced from each other on the base 512 in the first direction X. The flexible belt 523 wraps and passes around the first roller 521 and the second roller 522. The connecting member 511 and the screen body connecting mechanism 53 are connected and fixed to the flexible belt 523. When the driver 54 drives the base 512 and the second support body 22 to move, the flexible belt 523 drives the screen body connecting mechanism 53 to move.

The second transmitting mechanism 52 is located at a side of the first transmitting mechanism 51 in the second direction Y, the connecting member 511 is connected to the first support body 21, and the flexible belt 523 is connected to the connecting member 511, thus when the driver 54 drives the base 512 and the second support body 22 to move relative to the connecting member 511 through the transmitting member 513, the connecting member 511 will drive the flexible belt 523 to move synchronously, so that the flexible belt 523 can drive the first roller 521 and the second roller 522 to rotate, and at the same time, the flexible belt 523 will pull the screen body connecting mechanism 53 to drive the screen body connecting mechanism 53 and the second support body 21 to move in the same direction. Therefore, the power input by the driver 54 can be transmitted to the first transmitting mechanism 51 and the second support body 22, and also transmitted to the second transmitting mechanism 52 and the screen body connecting mechanism 53 through the first transmitting mechanism 51, so that the second support body 22 and the screen body connecting mechanism 53 can move in the same direction. Therefore, it is beneficial to ensure the synchronous movement of the screen body connecting mechanism 53 and the second support body 22 and reduce the possibility that one of the screen body connecting mechanism 53 and the second support body 22 has a movement hysteresis relative to the other, which causes the flexible screen 100 to bear a large tensile force or impact force to cause the structural damage.

In some embodiments, the flexible belt 523 is a steel wire or a synchronous belt. The flexible belt 523 may be of one-piece construction.

In some embodiments, in the second direction Y, the first transmitting mechanism 51 is located at one side of the flexible belt 523, and the screen body connecting mechanism 53 is located at the other side of the flexible belt 523. In the first direction X, at least part of the connecting member 511 of the first transmitting mechanism 51 is located between the first roller 521 and the second roller 522. In the first direction X, at least part of the screen body connecting mechanism 53 is located between the first roller 521 and the second roller 522. Exemplarily, when the second support body 22 moves and approaches to the first support body 21 and the flexible screen 100 is in a retracted state, the first roller 521 is close to the connecting member 511, and the second roller 522 is close to the screen body connecting mechanism 53. When the second support body 22 moves away from the first support body 21 and the flexible screen 100 is in an unfolded state, the second roller 522 is close to the connecting member 511, and the first rolling wheel 521 is close to the screen body connecting mechanism 53.

In some embodiments, the screen body connecting mechanism 53 includes a tensioning member 531. When the flexible screen 100 is connected to the screen body connecting mechanism 53, the tensioning member 531 is configured to tension the flexible screen 100 to be connected to the screen body connecting mechanism 53. The tensioning member 531 is configured to tension the screen body connecting mechanism 53 in the first direction X, so that the tension force of the flexible screen 100 can be fine-tuned through the screen body connecting mechanism 53, so as to further ensure that the flexible screen 100 remains in a tensioned-and-flat state during the unfolding or retracting process, improve the display effect of the flexible screen 100, and reduce the possibility of the flexible screen 100 being wrinkled.

In some embodiments, the screen body connecting mechanism 53 further includes a screen body connecting block 532 and a transmitting block 533. The screen body connecting block 532 is configured to connect the flexible screen 100. The screen body connecting block 532 and the transmitting block 533 are respectively movably connected to the second support body 22 in the first direction X. The second transmitting mechanism 52 is connected to the transmitting block 533, so that the second transmitting mechanism 52 can transmit the power to the transmitting block 533. In the first direction X, the screen body connecting block 532 is located at a side of the transmitting block 533 close to the first support body 21. The tensioning member 531 can apply a pushing force to the screen body connecting block 532 in the first direction X. A direction of the pushing force is away from the transmitting block 533 and always directed toward the first support body 21. Exemplarily, in the first direction X, the tensioning member 531 is located between the screen body connecting block 532 and the transmitting block 533. Exemplarily, in an embodiment in which the second transmitting mechanism 52 includes the flexible belt 523, the transmitting block 533 is connected to the flexible belt 523.

Since the tensioning member 531 can always apply the pushing force to the screen body connecting block 532 in the first direction X, the direction of the pushing force is away from the transmitting block 533, and the pushing force can remain constant or fluctuate in a small range, during the unfolding or retracting process of the flexible screen 100 connected to the screen body connecting block 532, it is beneficial that the tensioning member 531 can ensure the flatness of the flexible screen 100; while the flexible screen 100 is not easy to bear a large tensile force or unstable impact force, which is beneficial to reduce the possibility of abnormal display or cracks on the flexible screen 100 due to the large tensile force or unstable impact force.

In some embodiments, the tensioning member 531 is an elastic member. After the flexible screen 100 is connected to the screen body connecting block 532, the screen body connecting block 532 and the transmitting block 533 can jointly squeeze the elastic member, so that the elastic member in a compressed state can apply the pushing force to the screen body connecting block 532, and the direction of the pushing force is away from the transmitting block 533. In some examples, when the second support body 22 extends out from the first support body 21 and the flexible screen 100 is unfolded, the flexible belt 523 can drive the transmitting block 533 to move; at the same time, the flexible screen 100 can pull the screen body connecting block 532 to move to follow the transmitting block 533, so that a gap between the screen body connecting block 532 and the transmitting block 533 can remain unchanged. Thus, the elastic member can always be in the compressed state, and the pushing force applied by the elastic member on the screen body connecting block 532 can be a constant force. When the second support body 22 retracts the first support body 21 and the flexible screen 100 is retracted, the flexible belt 523 can drive the transmitting block 533 to move, and the transmitting block 533 can push the screen body connecting block 532 to move through the tensioning member 531 to retract the flexible screen 100, so that the gap between the screen body connecting block 532 and the transmitting block 533 can remain unchanged. Thus, the elastic member is always in the compressed state, and the pushing force applied by the elastic member on the screen body connecting block 532 can be the constant force. Therefore, in the process of unfolding and retracting the flexible screen 100, the stretching force carried by the flexible screen 100 itself can always be kept consistent, so that it is beneficial to reduce the possibility of abnormal display or cracks in the flexible screen 100 due to a large tensile force or an uneven impact force.

In some embodiments, a minimum distance between the screen body connecting block 532 and the transmitting block 533 is equal to a length of the elastic member when it is in a maximum compression state. Alternatively, at least one of the screen body connecting block 532 and the transmitting block 533 is provided with an accommodating portion. The elastic member is accommodated in the accommodating portion. A total depth of the accommodating portion is equal to a length of the elastic member when it is in a maximum compression state, so that after the screen body connecting block 532 and the transmitting block 533 jointly compress the elastic member, the minimum distance between the screen body connecting block 532 and the transmitting block 533 can be equal to zero. Exemplarily, in the first direction X, a surface of the screen body connecting block 532 facing the transmitting block 533 and a surface of the transmitting block 533 facing the screen body connecting block 532 are both provided with accommodating portions.

In some embodiments, the elastic member is a coil spring or a rubber member.

In some embodiments, referring to FIG. 6 and FIG. 7, the power unit 50 also includes a second guide rail 55. The second guide rail 55 is connected to the second support body 22. The second guide rail 55 extends in the first direction X. The screen body connecting block 532 and the transmitting block 533 are movably connected to the second guide rail 55 in the first direction X. The second guide rail 55 can ensure the stability of the moving process of the screen body connecting block 532 and the transmitting block 533, so that it is beneficial to reduce the possibility of causing the adverse impact to the flexible screen 100 due to the instantaneous impact of the screen body connecting block 532 and the transmitting block 533 due to the unsteady movement. Exemplarily, in the second direction Y, the first guide rail 514, the transmitting member 513 and the second guide rail 55 are arranged side by side. Exemplarily, in an embodiment in which the first transmitting mechanism 51 is connected to the second support body 21 through the base 512, and the second guide rail 55 is connected to the base 512. The number of the second guide rails 55 can be two or more, so that it is beneficial to further improve the stability of the moving process of the screen body connecting block 532 and the transmitting block 533. At least two of the second guide rails 55 are arranged side by side in the second direction Y.

In some embodiments, the second rail 55 is a guide rod. The screen body connecting block 532 and the transmitting block 533 are provided with guide holes matching with the shape of the guide rod. Exemplarily, in an embodiment in which the tensioning member 531 is a coil spring or a rubber member, the coil spring or the rubber member can sleeve on an outer periphery of the guide rod, so that the guide rod can constrain and limit the coil spring or the rubber member, thereby reducing the possibility of the elastic failure of the coil spring or the rubber member due to a middle part of the coil spring or the rubber member bending to a side during the compression process.

In some embodiments, in a second direction, at least two of the power units 50 are arranged to be spaced from one another. At least two of the power units 50 are configured to provide power for the second support body 22 in the first direction X, so that it is beneficial to further improve the stability of the moving process of the second support body 22, and reduce the possibility of adverse impact on the flexible screen 100 mounted on the screen body connecting mechanism 53.

In some embodiments, the support structural member 10 further includes a screen body fixing member 30 and a screen body connecting member 40. Referring to FIG. 3, the screen body fixing member 30 is arranged on the first support body 21. The screen fixing member 30 is configured to fix the flexible screen 100. The screen body fixing member 30 is located at a side of the screen body support surface 20a. An end of the flexible screen 100 can be connected and fixed to the screen fixing member 30. The screen body fixing member 30 and the first support body 21 can clamp the end of the flexible screen 100 to ensure the connection stability of the flexible screen 100 and reduce the possibility of the wrinkle of the flexible screen 100. Exemplarily, the screen fixing member 30 is a fixing frame.

The screen body connecting member 40 is located at a side of the second support body 22. The screen body connecting member 40 is configured to connect and fix the flexible screen 100. The screen body connecting member 40 is arranged at the inner surface 20b side of the support frame

20, that is, the screen body connecting member 40 is arranged at inside the support frame 20. The screen body connecting member 40 is connected to the screen body connecting mechanism 53. After the flexible screen 100 is mounted on the support structural member 10, the end of the flexible screen 100 away from the screen body fixing member 30 is bent toward the inner surface 20b of the support frame 20 and connected to the screen body connecting member 40. The screen body connecting member 40 and the screen body fixing member 30 can jointly stretch the flexible screen 100 to maintain the flatness of the flexible screen 100. Exemplarily, the screen body connecting member 40 is a connecting member plate.

In some embodiments, the power unit 50 can be fixed and connected with the first support body 21. That is, the power unit 50 can drive the second support body 22 to move, and the first transmitting mechanism is displaced synchronously with the second support body.

In some embodiments, the support frame 20 further includes a first bottom plate 23 and a second bottom plate 24. The first bottom plate 23 is connected to the first support body 21. The second bottom plate 24 is connected to the second support body 22. At least part of the power unit 50 and at least part of the screen body connecting member 40 are accommodated between the second bottom plate 23 and the second support body 22.

In some embodiments, the support frame 20 further includes a roller 25. The roller 25 is configured to support the flexible screen 100. In the first direction X, the roller 25 is arranged at an end of the second support body 22 away from the first support body 21. Two ends of the roller 25 opposite to each other in the second direction Y are rotatably connected to the second support body 22. The first direction X and the second direction Y are perpendicular to each other. An end of the flexible screen 100 is connected and fixed to the first support body 21, and a part of the flexible screen 100 is bent and abutted against the roller 25. The other end of the flexible screen 100 wrapping and passing around the roller 25 can be connected to the screen body connecting mechanism 53. When the flexible screen 100 is unfolded or retracted, the roller 25 will roll. The roller 25 can reduce the resistance of the flexible screen 100 in the process of unfolding or retracting, and can also reduce the possibility of the frictional damage caused by the direct contact between the flexible screen 100 and the second support body 22.

In some embodiments, the first support body 21 includes a plurality of first comb teeth. The second support body 22 includes a plurality of second comb teeth. The first support body 21 and the second support body 22 are plugged and connected through the first comb teeth and the second comb teeth. Each of the first comb teeth is inserted between each two adjacent second comb teeth, and each of the second comb teeth is inserted between each two adjacent first comb teeth.

In some embodiments, the second support body 22 is connected to the power unit 50. That is, the driver 54 drives the second support body 22 to move relative to the first support body 21 at a first speed V1 through the first transmitting mechanism 51. The second transmitting mechanism 52 and the first transmitting mechanism 51 move at the same speed, that is, the driver 54 drives the screen body connecting mechanism 53 to move relative to the second support body 22 at the first speed V1 through the first transmitting mechanism 51 and the second transmitting mechanism 52, at the same time, the driver 54 drives the screen body connecting mechanism 53 to move relative to the first support body 21 at a second speed V2 through the first transmitting mechanism 51 and the second transmitting mechanism 52, and V2=2*V1. Since the screen body connecting mechanism 53 and the second support body 22 move at the first speed V1, and the second support body 22 moves relative to the first support body 21 at the first speed V1, and the screen body connecting mechanism 53 moves relative to the first support body 21 at the second speed V2. Therefore, the second support body 22 is displaced for a distance L1 relative to the first support body 21 in the first direction, and the screen body connecting mechanism 53 is displaced for a distance L2 relative to the second support body 22 in the first direction, a displacement distance of the screen body connecting mechanism 53 relative to the first support body 21 is L3, and L3=L1+L2. Since a moving speed of the screen body connecting mechanism 53 is the same as a moving speed of the second support body 22, L1=L2, thus L3=2L1. Therefore, a total moving distance of a first end and a second end of the flexible screen 100 is 2L1, so that the flexible screen 100 can be unfolded or retracted synchronously with the expansion and contraction of the support body, so as to avoid tearing or wrinkling of the flexible screen 100. Since the first support body 21 does not move, the driver 54 drives the second support body 22 to move at the first speed V1 through the first transmitting mechanism 51. The driver 54 drives the screen body connecting mechanism 53 to move at the second speed V2 through the first transmitting mechanism 51 and the second transmitting mechanism 52, and V2=2*V1.

In some examples, the transmitting member 513 is a threaded rod. Two ends of the transmitting member 513 are rotatably connected to the base 512. The transmitting member 513 is threadedly connected to the connecting member 511. When the driver 54 drives the threaded rod to rotate, the threaded rod moves relative to the connecting member 511 in the first direction X. Exemplarily, when the driver 54 drives the threaded rod to rotate clockwise, the threaded rod, the base 512, the driver 54 and the movable support body 21 move in the first direction X and away from the first support body 21. When the driver 54 drives the threaded rod to rotate counterclockwise, the threaded rod, the base 512, the driver 54 and the second support body 22 move in the first direction X and approach to the first support body 21.

Figure 8:
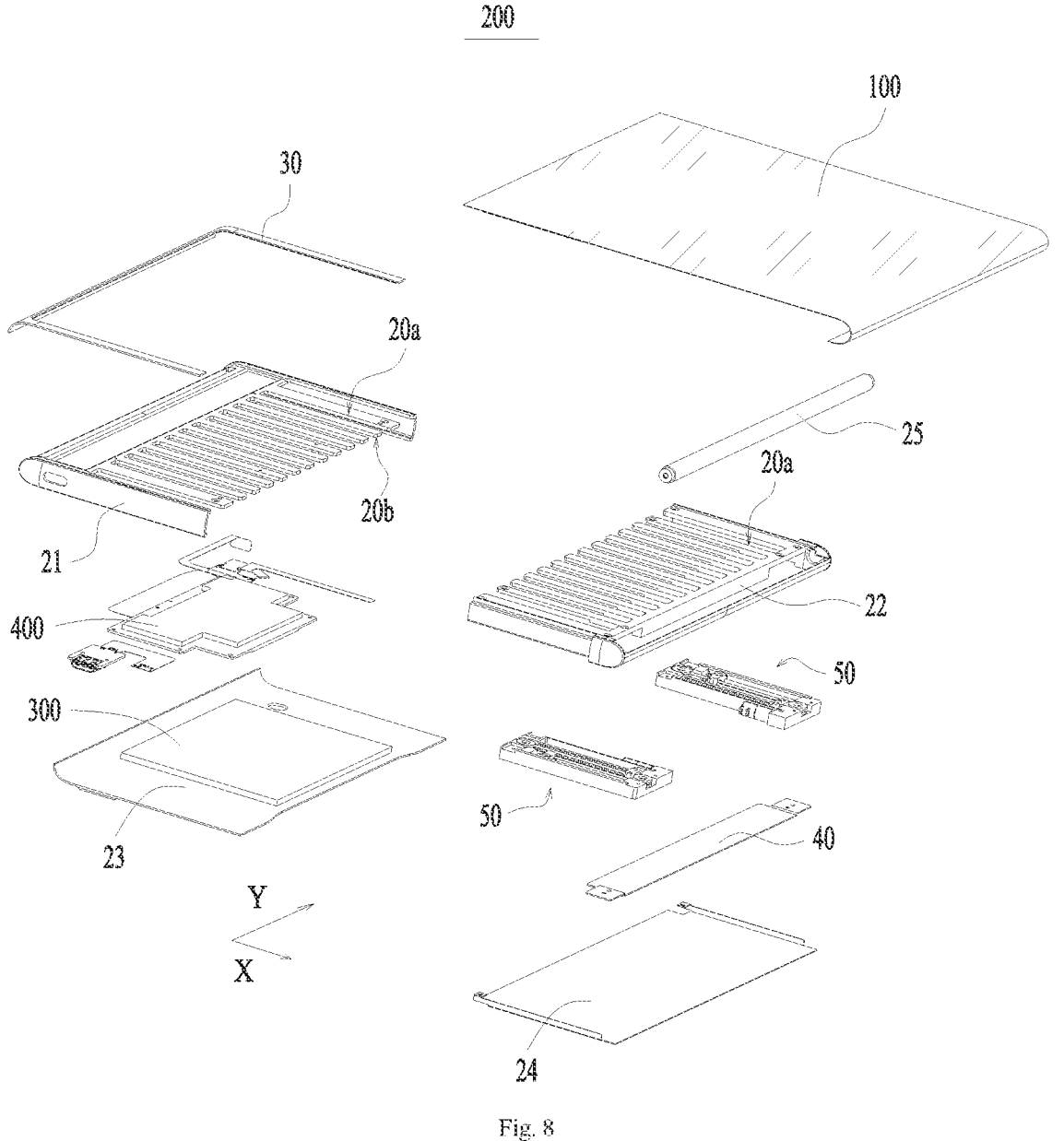
FIG. 8 shows a partial exploded structural schematic view of a display device according to an embodiment of the present application.

Referring to FIG. 8, the embodiments of the present application further provide a display device 200. The display device 200 includes a flexible screen 100 and the support structural member 10 according to the above-mentioned embodiments. The flexible screen 100 is configured to display images. The screen body support surface 20a of the support frame 20 is configured to support the flexible screen 100. One end of the flexible screen 100 is connected to the first support body 21, and the other end thereof is bent and arranged at the side of the second support body 22 away from the screen body support surface 20a and connected to the screen body connecting mechanism 53. When the driver 54 of the power unit 50 drives the screen body connecting mechanism 53 and the second support body 22 to move in the same first direction X, an overlapping area of a part of the flexible screen 100 accommodated in the second support body 22 and a part of the flexible screen 100 located outside the second support body 22 can increase or decrease, so as to increase or decrease an area of the flexible screen 13 on the support surface of the screen body and adjust a size of the exposed display area of the flexible screen 100. In this embodiment, the display device 200 may be a mobile phone. In some other optional embodiments of the present application, the display device 200 may also be any device with a display function, such as a tablet computer, a notebook, a monitor or the like.

In some embodiments, the display device 200 further includes a battery 300 and a circuit board 400. Both the battery 300 and the circuit board 400 are located at a side of the inner surface 20b of the support frame 20. The battery 300 and the circuit board 400 may correspond to the first support body 21. The battery 300 is configured to provide power for the display device 200, and the circuit board 400 can be configured to collect, process and analyze data to ensure that the display device 200 can normally display the images and the like.

Since the display device 200 includes the support structural member 10 described in any one of the above embodiments, the display device 200 has the beneficial effects of the support structural member 10 described in any one of the above embodiments, which will not be described in detail here.

Although the present application has been described with reference to the optional embodiments, the various modifications may be made to the embodiments and the equivalents may be substituted for the elements thereof without departing from the scope of the present application. In particular, as long as there is no structural conflict, the technical features mentioned in the various embodiments can be combined in any manner. The present application is not limited to the specific embodiments disclosed herein, but includes all technical solutions falling within the scope of the claims.

What is claimed is:

1. A support structural member for a display device, the support structural member comprising:

a support frame, comprising a screen body support surface, wherein the support frame comprises a first support body and a second support body, the first support body and the second support body are connected to each other, and the second support body is movable relative to the first support body in a first direction; and a power unit, comprising a transmitting mechanism, a screen body connecting mechanism and a driver, wherein the driver drives the second support body to move relative to the first support body in the first direction through the transmitting mechanism, and the driver drives the screen body connecting mechanism to move through the transmitting mechanism, so that the second support body and the screen body connecting mechanism move in the same first direction, wherein the transmitting mechanism comprises a first transmitting mechanism and a second transmitting mechanism arranged in linkage with each other, the driver drives the second support body to move relative to the first support body in the first direction through the first transmitting mechanism, the first transmitting mechanism comprises an connecting member, a base and a transmitting member, the connecting member is connected to the first support body, the base is connected to the second support body, the transmitting member is connected to the base, the transmitting member is movable relative to the connecting member in the first direction, and the driver is arranged on the base and drives the transmitting member to move relative to the connecting member, so that the base and the second support body move synchronously.

2. The support structural member according to claim 1, wherein the transmitting member is a threaded rod, two ends of the transmitting member are rotatably connected to the base, and the transmitting member is threadedly connected to the connecting member.

3. The support structural member according to claim 1, wherein the first transmitting mechanism further comprises a first guide rail, the first guide rail is connected to the base, the transmitting member and the first guide rail are arranged side by side and to be spaced from each other, the first guide rail is movably connected to the connecting member in the first direction.

4. The support structural member according to claim 1, wherein the second transmitting mechanism further comprises a first roller, a second roller and a flexible belt; in the first direction, the first roller and the second roller are arranged on the base with a distance therebetween; the flexible belt wraps and passes around the first roller and the second roller; the connecting member and the screen body connecting mechanism are connected and fixed to the flexible belt; when the driver drives the base to move, the flexible belt drives the screen body connecting mechanism to move.

5. The support structural member according to claim 4, wherein the flexible belt is a steel wire or a synchronous belt.

6. The support structural member according to claim 4, wherein in a second direction, the first transmitting mechanism is located at one side of the flexible belt; the screen body connecting mechanism is located at the other side of the flexible belt; the first direction is perpendicular to the second direction.

7. The support structural member according to claim 1, further comprising a screen body fixing member and a screen body connecting member, wherein the screen body fixing member is arranged on the first support body and located at a side of the screen body support surface, and the screen body connecting member is arranged on the second support body and located inside the support frame.

8. The support structural member according to claim 1, wherein the screen body connecting mechanism comprises a tensioning member, and the tensioning member is configured to tension a flexible screen to be connected to the screen body connecting mechanism.

9. The support structural member according to claim 8, wherein the screen body connecting mechanism further comprises a screen body connecting block and a transmitting block; the screen body connecting block and the transmitting block are movably connected to the second support body in the first direction; the second transmitting mechanism is connected with the transmitting block; in the first direction, the screen body connecting block is located at a side of the transmitting block close to the first support body; the tensioning member is capable of applying a pushing force to the screen body connecting block in the first direction; a direction of the pushing force is away from the transmitting block and directed toward the first support body.

10. The support structural member according to claim 9, wherein the power unit further comprises a second guide rail; the second guide rail is connected to the second support body; the second guide rail extends in the first direction; the screen body connecting block and the transmitting block are movably connected to the second guide rail.

11. The support structural member according to claim 10, wherein the second guide rail is a guide rod.

12. The support structural member according to claim 9, wherein the tensioning member is an elastic member, and the tensioning member is located between the screen body connecting block and the transmitting block.

13. The support structural member according to claim 12, wherein a minimum distance between the screen body connecting block and the transmitting block is equal to a length of the elastic member in a maximum compression state; or at least one of the screen body connecting block and the transmitting block is provided with an accommodating portion, the elastic member is accommodated in the accommodating portion, and a total depth of the accommodating portion is equal to a length of the elastic member in a maximum compression state.

14. The support structural member according to claim 12, wherein the elastic member is a coil spring or a rubber member.

15. The support structural member according to claim 1, wherein in a second direction, at least two of the power units are arranged to be spaced from one another, and the first direction is perpendicular to the second direction.

16. The support structural member according to claim 1, wherein the driver drives the second support body to move at a first speed V1 through the first transmitting mechanism, the driver drives the screen body connecting mechanism to move at a second speed V2 through the first transmitting mechanism and the second transmitting mechanism, and V2=2*V1.

17. The support structural member according to claim 1, wherein the first transmitting mechanism drives the second support body to move relative to the first support body at a first speed V1, a moving speed of the first transmitting mechanism is the same as a moving speed of the second transmitting mechanism, the driver drives the screen body connecting mechanism to move relative to the first support body at a second speed V2 through the first transmitting mechanism and the second transmitting mechanism, and V2=2*V1.

18. The support structural member according to claim 1, wherein the second support body is displaced for a distance L1 relative to the first support body in the first direction, the screen body connecting mechanism is displaced for a distance L2 relative to the second support body in the first direction, a displacement distance of the screen body connecting mechanism relative to the first support body is L3, and L3=L1+L2.

19. A display device, comprising
a flexible screen; and
the support structural member according to claim 1, wherein the screen body support surface is configured to support the flexible screen; one end of the flexible screen is connected to the first support body, and the other end of the flexible screen is bent and arranged at a side of the second support body away from the screen body support surface and connected to the screen body connecting mechanism; when the driver drives the screen body connecting mechanism and the second support body to move in the same first direction, an area of the flexible screen on the screen body support surface increases or decreases.

\* \* \* \* \*